United States Patent
Parish et al.

[15] 3,645,679
[45] Feb. 29, 1972

[54] CONCENTRATING FLUOSILICIC ACID

[72] Inventors: William R. Parish; James C. Kelley, both of Lakeland, Fla.

[73] Assignee: Wellman-Lord, Inc.

[22] Filed: Mar. 9, 1970

[21] Appl. No.: 17,590

[52] U.S. Cl. ........................ 23/153, 23/167, 23/182 V, 23/205
[51] Int. Cl. .................. C01b 7/00, C01b 33/12, C01b 33/08
[58] Field of Search ............... 23/153, 88, 182 V, 205, 167

[56] References Cited

UNITED STATES PATENTS

| | | | |
|---|---|---|---|
| 3,218,124 | 11/1965 | Oakley, Jr. et al. | 23/153 |
| 3,218,126 | 11/1965 | Wilkinson | 23/153 |
| 3,218,128 | 11/1965 | Klem | 23/153 |
| 1,960,347 | 5/1934 | Osswald et al. | 23/153 |
| 2,456,509 | 12/1948 | Hopkins, Jr. et al. | 23/153 |
| 3,415,039 | 12/1968 | Rushton et al. | 23/153 X |
| 3,233,969 | 2/1966 | Heller et al. | 23/182 |
| 3,218,125 | 11/1965 | Houston et al. | 23/153 |

*Primary Examiner*—Edward Stern
*Attorney*—John W. Behringer, Eugene L. Bernard, Martin J. Brown, James N. Dresser, W. Brown Morton, Jr., James T. Roberts, Malcolm L. Sutherland and Morton, Bernard, Brown, Roberts & Sutherland

[57] ABSTRACT

A process for the concentration of aqueous fluosilicic acid solution is disclosed. In the process, a dilute aqueous fluosilicic acid solution is mixed with concentrated sulfuric acid in the presence of silica in a mixing zone to release a gaseous overhead of silicon tetrafluoride (formed by dehydration of the fluosilicic acid) and yield dilute sulfuric acid as bottoms; the gaseous overhead is passed to a scrubbing zone to effect reaction of the silicon tetrafluoride with dilute fluosilicic acid, and thereby yield a slurry of silica in concentrated, aqueous, fluosilicic acid solution. The silica and the concentrated acid are separated, and the silica can be sent to the mixing zone.

10 Claims, 1 Drawing Figure

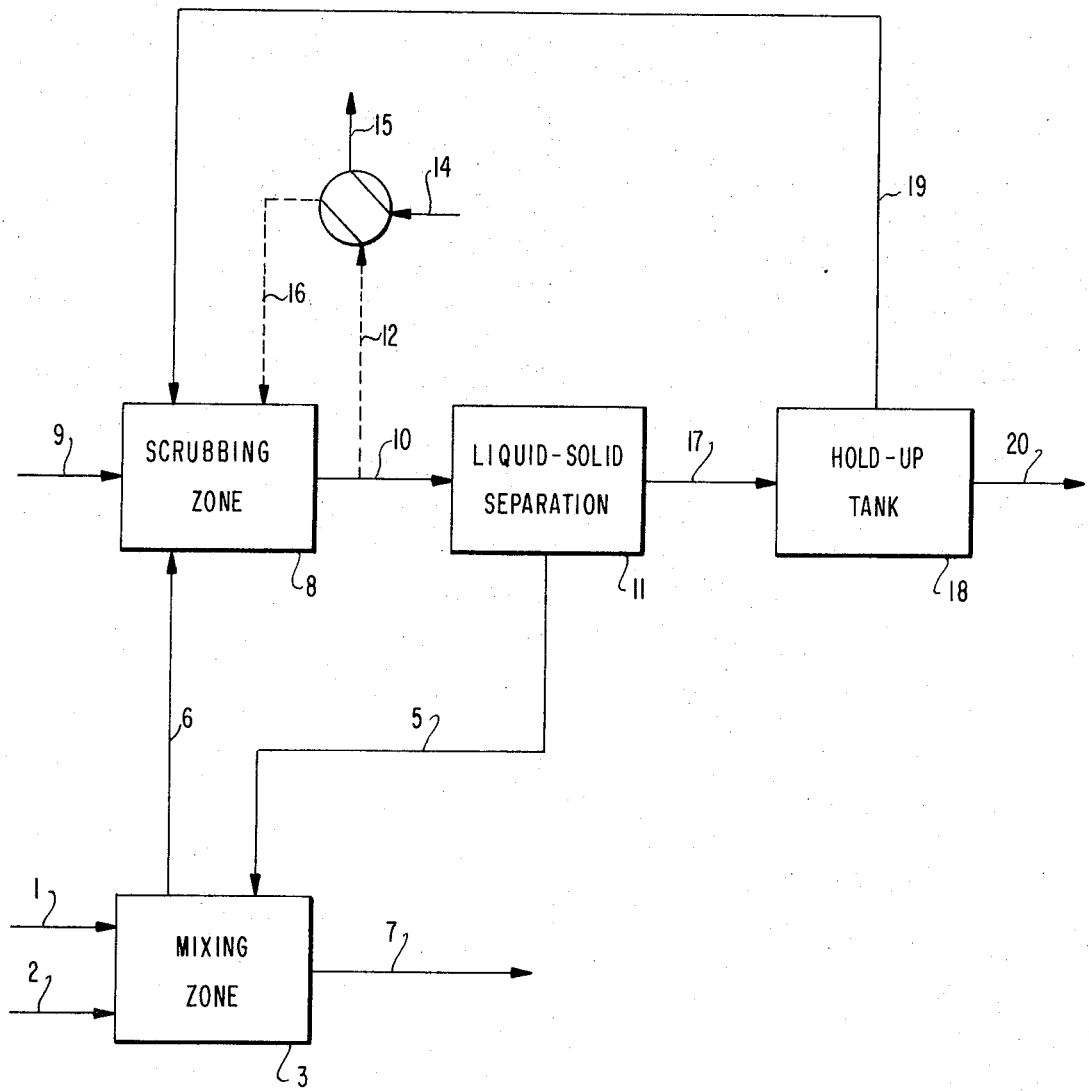

CONCENTRATING FLUOSILICIC ACID

Other applications, commonly owned herewith, concerning processes of treating fluosilicic acid are U.S. Ser. No. 812,229, filed Apr. 15, 1969; U.S. Ser. No. 17,580, filed Mar. 9, 1970; and U.S. Ser. No. 17,611, filed Mar. 9, 1970.

This invention relates to a process for the concentration of dilute aqueous solutions of fluosilicic acid by dehydration with concentrated sulfuric acid to prepare concentrated aqueous solutions of fluosilicic acid. Dilute sulfuric acid, suitable, for example, for digesting phosphate rock by the "wet" process in the manufacture of phosphoric acid, is also produced.

The process of the present invention involves mixing strong sulfuric acid, including oleum, having a concentration generally of at least about 85 weight percent, say about 85 to 100 weight percent, preferably about 90 to 99 weight percent, with a dilute aqueous solution of fluosilicic acid having a composition ranging normally from about 10 to about 30 weight percent $H_2SiF_6$ and about 70 to 90 weight percent water, preferably about 15 to 25 weight percent $H_2SiF_6$ and about 75 to 85 percent water.

The weight ratio of the acids in the mixing zone is such that the sulfuric acid bottoms has a concentration of at least about 65 weight percent and advantageously about 70 to 95 weight percent. The weight ratio on an anhydrous basis in the mixing zone is thus normally about 5 to 30 parts, preferably about 15 to 20 parts, sulfuric acid per part of fluosilicic acid.

The mixing of the two acids is carried out in a mixing zone in the presence of silica at a temperature of from about ambient, e.g., 80° F., to about 300° F., preferably from about 100° to about 250° F., such that the fluosilicic acid is dehydrated as follows:

1. $2H_2SiF_6 + SiO_2 \xrightarrow{H_2SO_4} 3SiF_4 + 2H_2O$

The pressure in the mixing zone is sufficiently low to allow the silicon tetrafluoride to evolve from the zone as gaseous overhead and the diluted sulfuric acid to be removed from the zone as liquid bottoms. Atmospheric pressure is normally advantageous.

Dilute aqueous fluosilicic acid solutions containing about 10 to 30 weight percent $H_2SiF_6$ and about 70 and 90 weight percent water, and suitable as feeds for the present process, are normally produced as a byproduct in phosphoric acid manufacture. The silica present in the mixing zone can be supplied from the silica produced in the scrubbing zone, as explained below, and is generally added to the mixing zone as a filter cake of silica which is damp with concentrated fluosilicic acid. Reactive silica can also be supplied from other sources to the mixing zone and can, for example, be present in the fluosilicic acid feed solution, for example by using as the feed solution that fluosilicic acid solution which is obtained from superphosphate scrubbers. The amount of silica added to the mixing zone is at least about stoichiometric to the silica needed for the dehydration of the fluosilicic acid in accordance with the above reaction equation.

The solubility of the $SiF_4$ in the liquid mixture in the mixing zone is a function of the temperature in the zone and of the concentration of the sulfuric acid solution therein. The lower the concentration of the sulfuric acid solution, the higher the temperature needed to drive the gaseous $SiF_4$ from the liquid mixture. The temperature in the zone depends mainly upon the inlet temperature of both acids, the heat of dilution of the sulfuric acid, and the heat of vaporization of the $SiF_4$ gas. The latter (the heat of vaporization of the $SiF_4$ gas) tends to counterbalance the heat of dilution of the sulfuric acid. Normally, it is not necessary to preheat the acids being introduced to the zone in order to obtain satisfactory removal of $SiF_4$. The gaseous overhead produced in the dehydration is preferably anhydrous and preferably contains essentially all of the silicon tetrafluoride produced from the mixture of the sulfuric and fluosilicic acids and silica.

The fluosilicic acid is dehydrated during the time beginning with its admixture with the concentrated sulfuric acid and the sulfuric acid is correspondingly diluted. Silicon tetrafluoride and water are the products of the dehydration of fluosilicic acid. As noted before, silicon tetrafluoride exits the mixing zone as substantially anhydrous, gaseous overhead. The diluted sulfuric acid, diluted by the water produced in the dehydration reaction, exits the zone is liquid bottoms, for example having a sulfuric acid concentration of at least about 65, often about 70 to 95, weight percent. This concentration can be controlled by adjusting the ratio of the sulfuric acid to the fluosilicic acid introduced to the mixing zone. Any excess silica in the mixing zone also exits with the diluted sulfuric acid.

The amount of sulfuric acid in the bottoms from the mixing zone is advantageously above about 65 weight percent, based on the combined weight of water and sulfuric acid. Above about 65 weight percent sulfuric acid, the silica reaction with any HF which might be present gives silicon tetrafluoride as the product, as follows:

2. $4HF + SiO_2 \rightarrow SiF_4 + 2H_2O$

However, below about 65 weight percent sulfuric acid, the reaction proceeds as follows:

3. $6HF\ SiO_2 \rightarrow H_2SiF_6 + 2H_2O$

Thus, the amount of the sulfuric acid in the sulfuric acid bottoms should advantageously be above about 65 weight percent, preferably above about 70 weight percent, so that silicon tetrafluoride is produced. The silicon tetrafluoride is removed as a gaseous overhead and then directly converted into fluosilicic acid in the scrubbing or concentration zone described hereinafter.

The fluorine level present in the diluted sulfuric acid bottoms is normally less than about 0.2 percent by weight. This low fluorine, diluted sulfuric acid bottoms product is useful in phosphoric acid manufacture and sometimes may also be admixed with concentrated sulfuric acid to form a suitable sulfuric acid feed for the preset concentration process.

The gaseous overhead containing essentially all of the silicon tetrafluoride from the dehydration of the fluosilicic acid feed is contacted with a dilute, aqueous, fluosilicic acid solution in the scrubbing zone. The fluosilicic acid wash or scrubbing solution may advantageously be of the same composition as previously described as being a useful feed to the mixing zone in the process of this invention. It is preferred that the wash solution be essentially silica-free. In the scrubbing zone, the silicon tetrafluoride in the gaseous overhead is contacted and reacted with water to form fluosilicic acid and hydrated silica. The reactions in the scrubbing zone will be described in greater detail hereinafter.

The scrubbing zone serves to concentrate the fluosilicic acid content of the aqueous scrubbing medium in the hydration zone. Depending upon the concentration of hydrogen fluoride in the gaseous overhead, the concentration is accomplished by the occurrence of the following reactions in varying degrees. Normally, however, there will be very little HF in the gaseous overhead, especially if there is an excess of silica over the stoichiometric amount required in the mixing zone.

4. $3SiF_4 + 2H_2O \rightarrow 2H_2SiF_6 + SiO_2$
5. $6HF + SiO_2 \rightarrow H_2SiF_6 + 2H_2O$
6. $4HF + SiO_2 \rightarrow SiF_4 + 2H_2O$
7. $2HF + SiF_4 \rightarrow H_2SiF_6$ The scrubbing zone is normally maintained at a temperature of up to about 150° F., e.g., from about ambient to about 150° F., preferably (and especially where cooling water is available) about 50° to 120° F. The scrubbing zone can be supplied by any suitable gas-liquid contacting vessel as, for example, one or more spray towers which may contain cooling means to maintain the temperature. Additionally, any silicon tetrafluoride gases passing through the scrubbing zone unreacted may be routed to a second scrubbing zone for absorption in aqueous fluosilicic acid wash solution to reduce $SiF_4$ losses.

The primary reaction in the scrubbing zone is equation 4 above, which yields a slurry of hydrated silica and concentrated fluosilicic acid. The slurry leaving the scrubbing zone may be treated to remove the precipitated silica content. The separation of the silica from the fluosilicic acid product is accomplished in a silica separation zone, for example by centrifugation, filtration or decantation. The hydrated silica cake can contain some of the concentrated fluosilicic acid but it is preferred that the separated cake have a $H_2SiF_6/SiO_2$ ratio of less than about 4.8/1 by weight. The separated silica may be then used in the dehydration reaction in the mixing zone. Any residual concentrated fluosilicic acid which is present with the separated silica that is sent to the mixing zone is also dehydrated by the sulfuric acid in the zone to produce silicon tetrafluoride gaseous overhead.

The fluosilicic acid solution from the silica separation zone is the concentrated fluosilicic acid product of this invention. The concentrated product is at a temperature of up to about 150° F. and normally about 50° to 120° F. A portion of the concentrated fluosilicic acid product can be recycled to the scrubbing zone to control the concentration of hydrated silica within a desired range. This product is then passed to a suitable storage zone. The concentrated fluosilicic acid solution prepared by the process of this invention has a fluosilicic acid content ranging from about 20 to more than about 60 percent by weight, depending upon the particular feed, scrubbing medium used in the scrubbing zone and other process variables. The fluosilicic acid concentration of the concentrated solution product is always higher than the fluosilicic acid concentration of the dilute solution feed. Normally, the products will have a fluosilicic acid content of from about 40 to 60 percent by weight.

The process of the instant invention can be more readily described by reference to the drawings in which the FIGURE sets forth a flowsheet illustrating the invention.

Referring to the FIGURE, fluosilicic acid, at a temperature of about ambient up to about 250° F. and a concentration of from about 10 to 30 weight percent $H_2SiF_6$, is carried in line 1 to reactor 3 where it is combined with 85 to 100 percent concentrated sulfuric acid introduced via line 2 at a temperature of from about ambient up to about 240° F. The weight ratio (anhydrous) of sulfuric acid to fluosilicic acid introduced to the reactor is about 5:1 to 30:1. The acids are mixed, heated if desired, and maintained at a temperature of up to about 300° F. Silica removed from the concentrated fluosilicic acid product, as described below, enters the reactor via line 5. $SiF_4$ gas flashes off under the approximately atmospheric pressure conditions maintained in the reactor and is removed via line 6. Dilute sulfuric acid of a concentration of about 70 to 95 weight percent, preferably about 80 to 85 weight percent, is removed through line 7 for ultimate recovery.

The gaseous overhead from the reactor 3 is passed into scrubbing zone 8, mixing at a temperature of from about ambient up to about 120° F., where it is contacted with a wash liquid of a dilute, aqueous fluosilicic acid solution supplied through line 9. The wash liquid is generally of the same composition as the dilute fluosilicic acid solution feedstock in line 1.

The slurry of silica in concentrated fluosilicic acid solution, the latter having a concentration of about 20 to 70, preferable about 40 to 50, weight percent fluosilicic acid, is removed from the scrubbing zone 8 through line 10 to the liquid-solid separation zone 11. Part of the slurry can be recycled from line 10 through line 12 into heat exchanger 13 where it is cooled by indirect heat exchange with cooling water entering heat exchanger 13 through line 14 and exiting through line 15. The cooled slurry reenters scrubbing zone 8 through line 16 from the heat exchanger 13 to assist in maintaining the temperature in the scrubbing zone. The silica separation zone 11 can contain suitable filtering, centrifuging or decantation apparatus. The separated silica can be passed through line 5 to the reactor 3 as the silica charge. The separated concentrated fluosilicic acid product can be conveyed to holdup tank 18 through line 17. Part of the concentrated fluosilicic acid product can be recycled from holdup tank 18 through line 19 to the scrubbing zone 8 to maintain the acid-silica concentration within desired limits. The balance of the concentrated fluosilicic acid product can be removed from holdup tank 18 through line 20 and sent to storage.

The concentration process of this invention is additionally advantageous for integrated use in the preparation of superphosphate fertilizers. For instance, the diluted fluosilicic acid solutions useful herein as feeds may be the byproduct of the preparation of such fertilizers, while the sulfuric acid bottoms, after removal of hydrogen fluoride, are of such concentration that they are directly usable in the preparation of phosphoric acid, of which substantial portions of the total yearly production are used in the preparation of superphosphate fertilizers.

Also, the fluosilicic acid product solutions of this invention can be of such high concentrations that considerable savings in transportation costs are achieved. For instance, by increasing the concentration of fluosilicic acid from 25 to 50 percent by weight in commercial grades of fluosilicic acid solutions, substantial reductions in the water content are achieved. As a result of these reductions, the transportation cost per pound of fluorine can be reduced by about 50 percent. This reduction in transportation costs per pound of fluorine is significant in light of the large amounts of fluosilicic acid solutions used today in the fluoridation of water supplies.

The concentrated fluosilicic acid solutions produced by the process of this invention are also advantageous for direct use in the preparation of anhydrous hydrogen fluoride and can be used, for example, as the feedstock in the process disclosed in copending application Ser. No. 816,229, filed Apr. 15, 1969, in the names of William R. Parish, James C. Kelley, Albert Giovanetti and William A Lutz.

The following example serves to describe preferred procedures for accomplishing the concentration process of this invention.

EXAMPLE

The process flow for this example is illustrated by the Figure. By this embodiment of the invention, substantially pure (i.e., the precipitated silica has been removed), concentrated fluosilicic acid is prepared. The process conditions are as follows.

Dilute fluosilicic acid, e.g., about 25 percent concentration by weight, in an amount of 273 pounds and at a temperature of about ambient, e.g., about 80° F., enters reactor 3 through line 1 while 6,268 pounds of concentrated, e.g., 93 percent by weight, $H_2SO_4$ at about 150° F. enters the reactor through line 2. About 1,597 pounds of damp silica filter cake from the solid-liquid separation zone 11 enters the reactor through line 5. The filter cake contains about 160 pounds of silica and about 1,437 pounds of a 50 weight percent aqueous solution of fluosilicic acid. 830 pounds of $SiF_4$ gas is produced in reactor 3 and withdrawn via line 6. Dilute, e.g., about 80 percent by weight, sulfuric acid bottoms in an amount of about 7,306 pounds is removed from the reactor via line 7. The dilute sulfuric acid bottoms contains a very minor amount, e.g., less than about 0.3 weight percent, $H_2SiF_6$.

The $SiF_4$ gas produced in reactor 3 is contacted in the scrubbing zone 8 with 1,727 pounds of a side stream (via line 9) of the same dilute, e.g., 25 percent by weight, $H_2SiF_6$ solution that is sent to reactor 3 through line 1, thus producing 7,992 pounds of a slurry of concentrated, e.g., 50 percent by weight aqueous fluosilicic acid solution and hydrated silica. The slurry contains about 2 percent by weight (or 160 pounds) of hydrated silica (calculated as $SiO_2$). The slurry is conveyed by line 10 to the silica separation zone 11. The filter cake, amounting to 1,597 pounds, which, as noted before, contains about 10 percent by weight silica, is conveyed from the silica separation zone 11 to the reactor 3 through line 5. The filtrate, 6,394 pounds, which is the 50 percent concentrated fluosilicic acid solution, is conveyed via line 17 to the holdup tank 18.

5,434 pounds of the concentrated fluosilicic acid product is recycled via line 19 to the scrubbing zone 8 and 960 pounds thereof is sent to storage via line 20.

We claim:

1. A process for concentrating dilute, aqueous fluosilicic acid solution containing about 10 to 30 weight percent $H_2SiF_6$ comprising:
   i. mixing sulfuric acid having a concentration of at least about 85 weight percent with a first portion of said dilute, aqueous fluosilicic acid solution in a mixing zone in the presence of silica to effect dehydration of the fluosilicic acid and dilution of the sulfuric acid, whereby silicon tetrafluoride is evolved as a gaseous overhead which is removed, and the diluted sulfuric acid is removed as bottoms from the zone;
   ii. contacting said silicon tetrafluoride gaseous overhead of (i) with a second portion of said dilute, aqueous fluosilicic acid solution in a scrubbing zone to effect reaction between said silicon tetrafluoride gaseous overhead and the water in the dilute, fluosilicic acid solution to form concentrated, aqueous fluosilicic acid and precipitated silica;
   iii. separating the silica from the concentrated, aqueous fluosilicic acid solution and recycling the separated silica to step (i); and
   iv. recovering concentrated aqueous fluosilicic acid solution product from the silica separation.
2. The process of claim 1 wherein the amount of silica employed in the mixing zone is at least about stoichiometric to that required in accordance with the reaction equation:

$$2H_2SiF_6 + SiO_2 \xrightarrow{H_2SO_4} 3SiF_4 + 2H_2O.$$

3. The process of claim 1 wherein the sulfuric acid is mixed with the fluosilicic acid in step (i) in an anhydrous weight ratio of sulfuric acid to fluosilicic acid of about 5 to 30:1 and sufficient to provide the diluted sulfuric acid bottoms with at least about 65 percent sulfuric acid, based on the combined weight of water and sulfuric acid.
4. The process of claim 3 wherein step (i), prior to the mixing, the sulfuric acid and fluosilicic acid are each at a temperature of about ambient up to about 300° F.
5. The process of claim 1 wherein the sulfuric acid employed in step (i) has a concentration of at least about 90 weight percent and the dilute fluosilicic acid solution contains about 15 to 25 weight percent $H_2SiF_6$.
6. The process of claim 1 wherein the sulfuric acid is mixed with the fluosilicic acid of step (i) in an anhydrous weight ratio of sulfuric acid to fluosilicic acid of about 5 to 30:1 and sufficient to provide the diluted sulfuric acid bottoms with at least about 70 percent sulfuric acid, based on the combined weight of water and sulfuric acid.
7. The process of claim 1 wherein part of the concentrated, aqueous fluosilicic acid solution product is recycled to the scrubbing zone.
8. The process of claim 1 wherein the scrubbing zone is maintained at a temperature of between about ambient and about 120° F.
9. The process of claim 8 wherein maintenance of the scrubbing zone temperature is effected by circulating at least a part of the zone's contents through an indirect heat exchanger for cooling and then reintroducing the cooled contents into the scrubbing zone.
10. A process for concentrating dilute, aqueous fluosilicic acid solution containing about 15 to 25 weight percent $H_2SiF_6$ comprising:
   i. mixing sulfuric acid having a concentration of at least about 90 weight percent with a first portion of said dilute, aqueous fluosilicic acid solution each of the sulfuric acid and fluosilicic acid being at a temperature prior to mixing of about ambient up to about 300° F., the anhydrous weight ratio of sulfuric acid to fluosilicic acid being from about 5 to 30:1 and sufficient to provide a diluted sulfuric acid bottoms having at least about 70 percent sulfuric acid, based on the combined weight of water and sulfuric acid, in a mixing zone in the presence of silica, in an amount at least about stoichiometric to that required in accordance with the following reaction equation:

$$2H_2SiF_6 + SiO_2 \xrightarrow{H_2SO_4} 3SiF_4 + 2H_2O,$$

to effect dehydration of the fluosilicic acid and dilution of the sulfuric acid whereby silicon tetrafluoride is evolved as a gaseous overhead which is removed, and the diluted sulfuric acid is removed as bottoms from the zone;
   ii. contacting said silicon tetrafluoride gaseous overhead of (i) with a second portion of said dilute, aqueous fluosilicic acid solution in a scrubbing zone maintained at a temperature of between about ambient and about 120° F., to effect reaction between said silicon tetrafluoride gaseous overhead and the dilute fluosilicic acid solution to form concentrated, aqueous fluosilicic acid solution and precipitated silica, the maintenance of the temperature of the scrubbing zone being effected by circulating at least part of the zone's contents through an indirect heat exchanger for cooling and then reintroducing the cooled contents into the scrubbing zone;
   iii. separating the silica from the concentrated, aqueous fluosilicic acid solution and recycling the silica to step (i); and
   iv. recycling part of the concentrated, aqueous fluosilicic acid solution from the silica separation to the scrubbing zone and recovering the remaining concentrated, aqueous fluosilicic acid solution product from the silica separation.

* * * * *

UNITED STATES PATENT OFFICE
CERTIFICATE OF CORRECTION

Patent No. 3,645,679      Dated February 29, 1972

Inventor(s) William R. Parish and James C. Kelley

It is certified that error appears in the above-identified patent and that said Letters Patent are hereby corrected as shown below:

Column 2, line 54, equation 4 should read--

$$3SiF_4 + 2H_2O \longrightarrow 2H_2SiF_6 + SiO_2$$ --.

Signed and sealed this 8th day of August 1972.

(SEAL)
Attest:

EDWARD M. FLETCHER, JR.      ROBERT GOTTSCHALK
Attesting Officer      Commissioner of Patents